United States Patent [19]

Buglewicz

[11] 3,917,905

[45] Nov. 4, 1975

[54] REMOTE INTERROGATOR DEVICE

[76] Inventor: Neal J. Buglewicz, 12 Empty Saddle Road, Rolling Hills Estates, Calif. 90274

[22] Filed: Feb. 4, 1974

[21] Appl. No.: 439,292

Related U.S. Application Data

[63] Continuation-in-part of Ser. No. 278,759, Aug. 8, 1972, abandoned.

[52] U.S. Cl. .................................. 179/6 E; 179/6 R

[51] Int. Cl.[2] .......................................... H04M 1/64

[58] Field of Search ................ 179/6 R, 6 E; 360/74

[56] References Cited

UNITED STATES PATENTS

| | | | |
|---|---|---|---|
| 3,287,508 | 11/1971 | Morrison | 360/74 |
| 3,293,365 | 12/1966 | Mitsui | 179/6 R |
| 3,337,690 | 8/1967 | Martin | 179/6 E |
| 3,673,332 | 6/1972 | Muller et al. | 179/6 E |
| 3,757,049 | 9/1973 | Bowsky et al. | 179/6 E |

*Primary Examiner*—Vincent P. Canney
*Assistant Examiner*—Stewart Levy
*Attorney, Agent, or Firm*—William R. Lane

[57] ABSTRACT

An attachment for a telephone answering machine which makes a duplicate recording of the messages recorded on the associated telephone answering machine and is adapted to be interrogated from a remote telephone independently of the associated telephone answering machine by an interrogator upon triggering the attachment by a special coded device controlled by the interrogator. The drvice can be reinterrogated at the end of the interrogation or during the interrogation without placing an additional telephone call through the telephone answering machine.

8 Claims, 2 Drawing Figures

REMOTE INTERROGATOR DEVICE

Figures 1, 2:
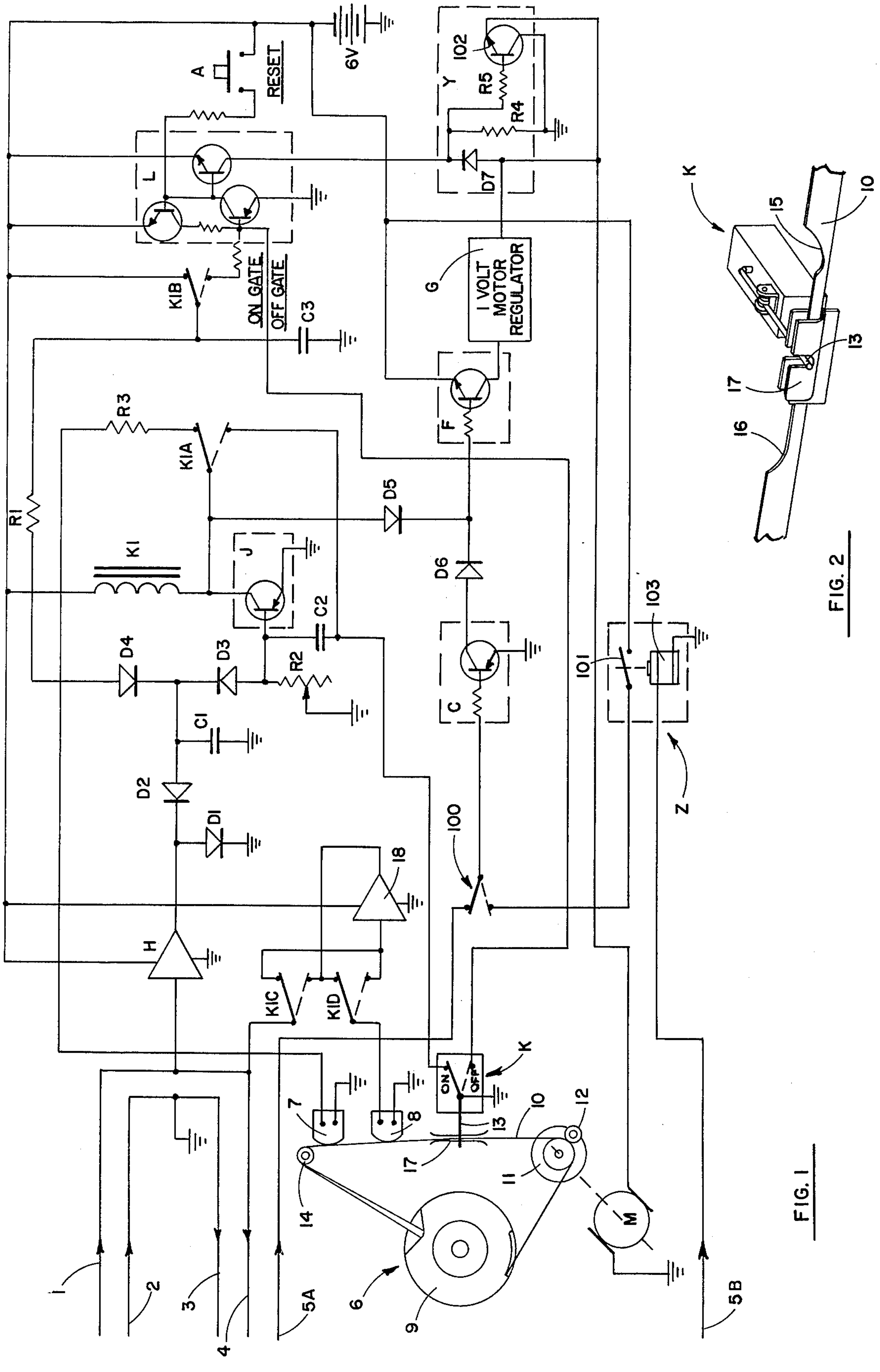

This application is a continuation-in-part of application Ser. No. 278,759 Aug. 8, 1972 now abandoned in the name Neal J. Buglewicz for Remote Interrogator Attachment.

BACKGROUND OF THE INVENTION

1. Field of the Invention

The invention relates to a device for interrogating a telephone answering machine and more particularly to a device for obtaining such interrogation from a remotely located telephone.

2. PRIOR ART

Telephone answering machines which have a remote interrogation capability are known in the prior art. However, such machines commonly utilize a reel to reel recording system which stores messages as they are received on the recording tape and when interrogated, must shift into a rewind mode and use mechanical contrivances not only to rewind, but also to return to a forward direction upon reaching the beginning of the tape.

Remote interrogator machines are also known in the art which utilize a recirculating loop, the purpose of which is to eliminate the mechanical complexity described above, but these require separate commands each time the mode of operation changes. For instance, a tone system is used wherein one beep is utilized for shifting the apparatus to the high speed mode and a second beep is utilized to initate playback of the messages for interrogation purposes. Further, a separate telephone call is required to reinterrogate the messages.

The prior art devices are built into the telephone answering machines and are not capable of being connected to an existing telephone answering machine that does not have an interrogation capability. Neither do they have the capability of interrogation from a duplicate recording of the recorded messages which duplicate recordings may be erased after being interrogated while retaining all of the messages upon the associated telephone answering machine.

STATEMENT OF THE INVENTION

The invention comprises an attachment for a telephone answering machine whereby messages recorded thereon may be interrogated from a remote telephone. The attachment is composed of a mechanism connected to the telephone answering machine for making a duplicate recording of incoming messages recorded on the telephone answering machine together with electronic circuitry which is responsive to a coded signal injected into the telephone line by an interrogator located at a remote telephone for playing back the messages recorded on the telephone answering machine. The messages recorded on the telephone answering machine are thus permitted to accumulate and are available for separate handling.

Reinterrogation may be initiated at any time during the playback, or at the conclusion of the playback, merely by again injecting the same coded signal into the telephone line.

Injection of the coded signal into the telephone line causes the tape of the attachment to move rapidly forward to its beginning and then at normal recording-broadcast speed during playback. A special brake arrangement causes the tape to change quickly from high speed to normal recording-broadcast speed, overcoming the mechanical inertia of the system, and allowing the first part of the broadcast transmission to occur at the proper tape speed. When the interrogation or reinterrogation is completed, the tape of the attachment is permitted to continue to run until it reaches its beginning, at which time it shuts off. The messages thereon will then be automatically erased by newly recorded messages which are duplicates of the further recordings being accumulated on the telephone answering machine.

In the accompanying drawing, which forms a part of this specification, there is shown a presently preferred embodiment of the invention, in which, FIG. 1 is a simplified schematic wiring diagram illustrating an embodiment of the invention, and FIG. 2 is a view of the cutoff switch arrangement which is used in the operation of the invention.

Referring now to the drawing, there are shown conductor lines 1 and 2 adapted to be operatively connected to an incoming telephone line; lines 3 and 4 adapted to be connected to a suitable telephone answering machine; and line 5A which is also connected to the telephone answering machine for transmitting trigger voltage from the telephone answering machine to the interrogator attachment which comprises the present invention.

The telephone answering machine to which present invention is an attachment may be that shown and described in Applicant's U.S. Pat. No. 3,705,265 or of the type described in U.S. Pat. Nos. 3,376,390 or 3,466,396, or any other telephone answering machine which has the characteristic of an incoming call recorder motor separate from the outgoing message motor; or an arrangement which has a single motor for driving the broadcast message means as well as the recording means.

In order to trigger the interrogator attachment, it is necessary to apply a negative DC voltage to C. The characteristics of switch C are selected to be responsive to the trigger voltage from line 5A so that when an incoming call is being recorded in the normal operation of the telephone answering machine, it will also cause the remote interrogator attachment to record a duplicate of the incoming message. To take care of those situations where the telephone answering machine does not have a suitable trigger voltage at 5A, there is provided an interface arrangement Z which is adapted to provide a trigger voltage that duplicates the trigger voltage necessary to operate switch C. When it is desired to operate with a different trigger voltage, switch 100 is moved to the on position to bring interface device Z into use. A signal from the telephone answering machine then being used is applied through line 5B to relay coil 103 to operate switch 101. Trigger voltage is thus applied to switch C directly from the battery of the remote interrogator attachment. Different relays would, of course, be necessary for different available trigger voltages, depending upon the characteristics of the particular telephone answering machine to which it is desired to connect the remote interrogator attachment. There could be any of several relay coils used for 103 so that interface could be accomplished with any telephone answering machine presently available. It could be made to operate with the type of machine that does not differentiate between incoming messages and outgoing messages. The only difference would be that outgoing messages would be heard as a matter of course between each incoming message when the remote interrogator attachment was interrogated.

The remote interrogator attachment comprising this invention includes a message recording device referred to generally as 6 and composed of an erase head 7 and a recording and playback head 8. A cartridge 9 contains a recirculating tape 10 which is drawn by capstan 11 and pinch roller 12 past guide means 17 of switch K and over guide roller 14. The tape is driven by motor M which is connected to the circuitry as hereinafter more particularly described to run in a recording mode when the telephone answering machine is recording and to run at high speed to the beginning of the recorded messages and thereafter at normal speed in a playback mode when suitably triggered by a coded signal from an interrogator. It is a feature of this device that motor speed control is obtained solely by a change in the applied voltage.

In order to record messages on the remote interrogator attachment which are duplicates of those recorded on the telephone answering machine, the following circuitry arrangement and functions are provided:

Telephone lines 1 and 2 are adapted to receive incoming calls which are transmitted to the telephone answering machine over lines 3 and 4. The telephone answering machine operates in a normal fashion to broadcast a message to the caller and advise the caller that any message which he may desire to leave will be recorded after hearing a tone signal. Simultaneously with the tone signal, the incoming call recorder in the telephone answering machine begins to run and the energizing voltage for the incoming recorder is transmitted over line 5A or 5B to the remote interrogator attachment to close switch C. The closing of switch C grounds the motor switch input F through diode D6 and cause switch F to close, thus applying voltage to the motor regulator G. The output of motor regulator G is approximately 1 volt, so the motor M runs at slow speed to draw tape 10 across the erase head 7 and the recording and playback head 8. Accordingly, any messages transmitted to the telephone answering machine are tapped off of line 4 and fed to the remote interrogator attachment recorder amplifier 18 through the de-energized contacts K1C where they are amplified and impressed across the recording and playback head 8 through the de-energized contacts K1D. During this time, the telephone line output of line 4 is also connected to the input of the tone filter amplifier H, but its output is restricted to a very narrow range of frequencies, typically 30Hz wide, so normal speech is not passed to the output. The erase head 7 is connected to the 6 volt bus through resistor R3, the de-energized contacts K1A, and the coil of relay K1 so that any old messages are erased. At the conclusion of the incoming call recording interval, the telephone answering machine initiates disconnect in normal fashion and the trigger voltage applied to control switch C vanishes. Thus the control switch C opens, causing the motor switch F to open. The motor M stops and the unit returns to the quiescent state in condition to accept another call.

INTERROGATION

When it is desired to interrogate the attachment from a remote telephone location and play back the messages recorded thereon, the interrogator dials the number of the telephone answering machine, listens to the outgoing message and then at the beginning of the incoming message interval, which is normally characterized by the sound of a "beep" tone, he injects a coded tone signal into the telephone transmitter. The tone, which is selected to be tuned to the frequency of the tone filter amplifier H, is amplified, passed through amplifier H and impressed across the rectifier-filter composed of diodes D1 and D2 and condenser C1, where it is converted into a negative going DC voltage. Diode D4 does not conduct at this time since it is back-biased off due to the 6 volt bus being connected to its anode through the de-energized contacts K1B and resistor R1. However, D3 does conduct due to the negative voltage applied to its cathode, which is coupled to the trigger switch J. Switch J responds by closing, thus grounding the relay coil of K1 and energizing relay K1 to cause the following sequence of events:

a. K1A provides a holding path to ground for K1 through the tape operated switch K, now in the up or closed position - so relay K1 is held.

b. K1A also removes erase bias from the erase head 7.

c. The anode of D5 is grounded, so motor switch F is provided with an alternate holding voltage. After the conclusion of the incoming call recording interval, the holding voltage provided through D6 by the control switch C vanishes, but switch F remains on due to the grounding of the anode of D5.

d. K1C connects the phone line to the output of amplifier 18.

e. K1D connects the recording and playback head 8 to the input of amplifier 18.

f. K1B connects the capacitor C3 to the "on" gate of the latching switch L which is designed to latch on until turned off by the "off" gate. C3 carries a 6 volt charge, picked up from K1B to the 6 volt bus in the de-energized condition. Latching switch L remains on after the charge on C3 dissipates, due to the feedback transistor in the latching switch L.

Thus, the energizing of relay K1 also causes the latching switch L to close, connecting 6 volts directly to the motor M and over-riding the motor regulator G causing the motor M to run at high speed. At high speed, the balance of tape 10 on the recirculating drum is quickly run off, in a matter of seconds, as the motor runs at about six times the normal speed.

It is the nature of the latching switch L to latch on and therefore it remains on after C3 has dissipated its charge and until the arm 13 of switch K drops into notch 15 on the tape at which time ground potential is applied to the off gate of switch L, causing that switch to open and return control of the motor to the 1 volt motor regulator G.

Capacitor C2 provides relay K1 with a time delay of about two seconds. When arm 13 of tape switch K moves into the down or open position, the voltage at K1 begins to increase since its ground return is broken. This increased voltage is transmitted through capacitor C2 and variable resistance R2 to the input of the switch J. As capacitor C2 charges through resistance R2, the voltage diminishes but R2 is adjusted to delay the release of K1 for approximately two seconds. Since tape 10 is moving at high speed at the instant arm 13 of switch K drops into notch 15 of the tape, the tape continues to move a sufficient distance to cause arm 13 to move out of notch 15 and beyond cut out portion 16 of the tape to where it again rides on the top edge of the tape and restores to the "on" position. During this time voltage is being applied to motor M through voltage regulator G. Relay K1 is held on until arm 13 is in the raised or "on" position for switch K whereby movement of the tape is continued at the slow or record playing speed. Amplifier 18 is still connected in the playback mode and any messages recorded on tape 10 are played back at the normal speed into the telephone line. The interrogator listens until he hears his own coded "beep" tone at which time he may hang up or reinterrogate. If he hangs up, the tape continues to run at slow speed for the duration of the tape length until arm 13 again drops into notch 15. At slow speed, it takes approximately three seconds for arm 13 to pass over notch 15 and cut out portion 16 as against less than one second when the tape is moving at high speed. Since C2 cannot maintain K1 for longer than 2 seconds, K1 is allowed to restore to its de-energized position and all its contacts restore.

This causes the following sequence of events:

a. K1A breaks the holding path from the relay to the tape switch and thence to ground.

b. The holding ground to D5 is also opened by K1A so the motor switch F opens and the motor M stops.

c. K1B restores capacitor C3 to the 6 volt bus.

d. K1C and K1D reverse the amplifier back to the record mode.

e. K1A reconnects the erase head through R3, R1A and relay coil K1 back to the 6 volt bus.

In view of the foregoing, the unit is returned to the quiescent state, with the tape at the beginning of the loop and ready to record additional calls. The duplicate recordings previously recorded on the tape will be erased by such additional recordings — such previous recordings being stored on the telephone answering machine.

REINTERROGATION

At any time during the playback interval as described herein, the caller may inject the coded message tone into the telephone line and cause the latching switch L to again operate and take over to have the recorded messages repeated. The injected coded message tone is passed through the tone filter amplifier H as before, rectified and filtered to a negative DC level as before, and applied to the junction of diodes D3 and D4, as before.

At this time, the trigger switch J is already locked on due to the grounding of K1A contacts through the tape switch K, so the trigger voltage has no effect on switch J. However, D4 now has its anode connected through R1 and the now held contacts K1B to the on gate of the latching switch L across capacitor C3. Due to the longer time constant of R1 and C3, a considerably longer tone is required to reinterrogate the unit — although the same tone is used. This is to prevent the unit from accidentally reinterrogating itself from any interrogation "beeps" which may be recorded on the tape from previous interrogations. However, after a sustained burst of tone (about 3 seconds), C3 charges sufficiently to trigger the latching switch L. When this occurs, the motor again runs at high speed until the notch 15 in the tape is reached, at which time it slows down and runs through the entire length of the tape at slow speed in the playback mode, as hereinbefore described.

ELECTRONIC BRAKING

It has been found that if speed of the tape is not positively reduced from rapid to recording-broadcast at the beginning of the messages on the tape, there is a garbled transmission of the messages until the tape in fact moves at recording-broadcast speed. To avoid this problem, a brake Y has been added to the circuitry. The brake comprises essentially of diode D7, transistor 102, bias resistor R4 and current limiting resistor R5. As illustrated in FIG. 1, the emitter of transistor 102 is connected to the motor M with its collector tied to ground so that when the transistor conducts, it effectively shorts out motor M and causes it to act as a brake in the following manner: During the high speed operation of motor M, 6V is applied to the motor from the switch L through diode D7 which is biased "on" to pass current. When the notch in the tape passes over the switch K, latching switch L is released as hereinbefore described and the 6V applied to the motor vanishes. The bias of the transistor is thus allowed to return to ground potential through resistors R4 and R5. However, the motor continues to spin from its own inertia to cause a terminal voltage from the "generator effect" of the motor. The voltage thus generated from the motor is applied to the emitter of the transistor 102 so that the transistor is properly biased to conduct heavily to thereby act as a low resistance and produce a braking action on the motor. As the motor slows, the braking action diminishes so that by the time the arm of switch K passes through the notch in the tape and again rides on top of the tape to reset switch K to the "on" position, the 1 volt regulator G is back in control of the motor.

RE-SET

The reset button A is used to clean off all previously recorded messages and to restore the tape drive of the remote interrogator attachment to the starting position. This is accomplished by momentarily depressing the reset button A to momentarily connect the 6 volt source to the on gate of latching switch L. Reset button A closes the latching switch L, thus applying high speed voltage to the motor M. Since relay K1 is not energized, the erase head 7 has current flow through it, and any old messages are erased. The phone line is not siezed, so there is no audio present across the reproduction and playback head 8 to be recorded. When the notch 15 passes under arm 13 of the tape switch K, it closes the off gate of the latching switch L, thus causing it to open. This removes applied voltage from the motor M, causing it to stop. The electronic brake Y described above causes the motor M to coast to a stop at a point close to the beginning of the tape. It should be noted that even if arm 13 of the tape switch K again moves to the up position, thus releasing the off gate, it has no effect, since there is no on gate input at this time.

Should the operator desire to clean off old messages and other noises recorded on the tape, he may depress the reset switch A a second time, thus starting the above sequence from the beginning of the tape loop. He may, if desired, insure that not even phone line transient voltages are recorded by simply unplugging the unit from the phone line during this final reset. The unit thus runs in the record mode at high speed for the entire circuit of the tape loop, then shuts itself off, as explained hereinabove.

Applicant has provided in this invention, a reliable device for interrogating messages from a remote telephone which have been previously recorded on a telephone answering machine. The remote interrogator device is inexpensive to construct and maintain, is free of mechanical linkages, reversing mechanisms, reel to reel tape drives and the like, and can be expected to withstand long service without other than normal maintenance.

What is claimed is:

1. In combination with a telephone answering machine adapted to be operatively connected to a telephone line and having means to respond to incoming telephone calls, means for broadcasting a message to callers including a tone signal at the end of said broadcast message and means for recording messages from such callers for later replay, a remote interrogator attachment operatively connected to said telephone line and said telephone answering machine, comprising:

an endless recirculating recording and broadcast tape loop, means responsive to said tone signal on said broadcast tape for driving said tape loop at recording-broadcast speed, means connected to said telephone answering machine to simultaneously record on said tape loop a duplicate recording of messages recorded on said telephone answering machine, a latching switch operatively connected to said driving means and responsive to a coded signal injected into the telephone line by a caller from a remote telephone to take control of said telephone line and cause said driving means to move said tape rapidly forward to the beginning of the messages on said loop, and switch means operative upon said tape loop reaching the beginning of messages thereon to change the speed of said tape loop to normal recording-broadcast whereby said messages will be over said telephone line to said remote caller, said switch means normally remaining operative to cause said tape loop to continue to run forwardly after all the messages thereon are broadcast to the remote caller until said tape loop reaches its beginning, and the recording of additional messages on said tape loop will erase the duplicate messages previously recorded thereon while leaving the original messages recorded on the telephone answering machine.

2. A device as recited in claim 1 in which said latching switch is responsive to the same coded signal at any time said messages are being broadcast into the telephone line or at the completion of such broadcast whereby to cause said tape to move rapidly forward to the beginning of said messages and thereafter at recording broadcast speed to repeat the broadcast of said messages into the telephone line.

3. A device for interrogating a telephone answering machine of the type that is adapted to be operatively connected to a telephone line and includes means to respond to incoming telephone calls, means for broadcasting a message to callers and means for recording messages from such callers for later replay, comprising:

a recording and broadcast tape, a recording and broadcast head, a motor for driving said tape, a regulator for causing said motor to drive said tape at recording-broadcast speed, switch means operative upon the conclusion of said broadcast message of said telephone answering machine for activating said motor to drive said tape past said head to simultaneously record a duplicate of any messages recorded on said telephone answering machine, latching switch means responsive to a coded signal injected into the telephone line by an interrogator from a remote telephone for taking control of said telephone line over-riding said regulator and cause said motor to move said tape forwardly at rapid speed to the beginning of said tape, and means operative when said tape reaches its beginning to inactivate said latching switch and cause said tape to move at recording-broadcast speed to broadcast into said telephone line to said interrogator any messages recorded on said tape.

4. A device as recited in claim 3 in which said switch means comprises:

a tape switch including an arm adapted to ride on top of said tape when in closed position and to drop into a notch in said tape to open said tape switch to normally stop said tape, and relay means adapted to continue the application of voltage to said motor after said arm drops into said notch and while said tape is decelerating to thereby move the notch portion of said tape past said arm to a position where said arm again rides on top of said tape and said thereafter is enabled to move at recording-broadcast speed.

5. A device as recited in claim 3 in which said latching switch means is responsive to said coded signal at any time while said messages are being broadcast into the telephone line or at the completion of such broadcast whereby to reinterrogate the messages recorded on said tape.

6. A device as recited in claim 3 in which said tape, after being interrogated, normally moves to its beginning to be in a position to again record duplicates of additional recordings made upon said telephone answering machine, such additional duplicate recordings serving to erase from said tape the previous duplicate recordings which are retained on the telephone answering machine.

7. Apparatus for interrogating over a telephone line from a remote telephone, messages previously recorded from callers to a particular telephone, including:

an endless recording and broadcast tape loop upon which messages to the particular telephone are recorded, motor means for selectively moving said tape forwardly at recording-broadcast speed when a low voltage is applied thereto and at a rapid speed forwardly when a higher voltage is applied thereto, latching switch means responsive to a coded signal injected into the telephone line for causing said higher voltage to be applied to said motor to move said tape at rapid speed to the beginning of said messages on said tape, switch means applicable when said tape reaches the beginning of said messages for disconnecting said latching switch and thereby cause low voltage to be applied to said motor to drive it at low speed, and brake means for positively reducing the speed of said tape from rapid to recording-broadcast upon the disconnection of said latching switch comprising means responsive to the generator effect of said motor moving at a high speed from its own inertia to provide a low resistance braking action on said motor until it reaches recording-broadcast speed.

8. A device as recited in claim 7 in which said means responsive to the generator effect of said motor includes means for shorting out said motor while decelerating from high to recording-broadcast speed to provide a diminishing resistance to its operation until it reaches recording-broadcast speed.

* * * * *